United States Patent
Park et al.

(10) Patent No.: US 8,677,216 B2
(45) Date of Patent: Mar. 18, 2014

(54) STACKED SEMICONDUCTOR MEMORY DEVICE AND RELATED ERROR-CORRECTION METHOD

(75) Inventors: Chul-Woo Park, Yongin-si (KR); Hong-Sun Hwang, Suwon-si (KR); Kwan-Young Oh, Suwon-si (KR); Sang-Beom Kang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 393 days.

(21) Appl. No.: 13/015,850

(22) Filed: Jan. 28, 2011

(65) Prior Publication Data

US 2011/0231735 A1  Sep. 22, 2011

(30) Foreign Application Priority Data

Mar. 18, 2010  (KR) .................. 10-2010-0024406

(51) Int. Cl.
*G11C 29/00*  (2006.01)

(52) U.S. Cl.
USPC ......................................... 714/764

(58) Field of Classification Search
USPC .............. 714/746, 763–764, 758; 365/185.09
See application file for complete search history.

(56) References Cited

U.S. PATENT DOCUMENTS

| 6,591,394 B2 * | 7/2003 | Lee et al. ..................... 714/766 |
| 6,678,860 B1 | 1/2004 | Lee |
| 8,050,109 B2 * | 11/2011 | Yan et al. ................. 365/189.05 |
| 2002/0192895 A1 * | 12/2002 | Taussig et al. ................ 438/237 |
| 2008/0212352 A1 | 9/2008 | Oh et al. |
| 2011/0307762 A1 * | 12/2011 | Tiziani et al. ................. 714/768 |

FOREIGN PATENT DOCUMENTS

| JP | 2001084792 A | 3/2001 |
| JP | 2009104757 A | 5/2009 |
| KR | 1020010017413 A | 3/2001 |
| KR | 1020080080882 A | 9/2008 |

* cited by examiner

*Primary Examiner* — Shelly A Chase
(74) *Attorney, Agent, or Firm* — Volentine & Whitt, PLLC (57) ABSTRACT

A stacked semiconductor memory device includes an error correction code (ECC) controller that controls the number of bits in an ECC word and corrects errors in memory cell array layers using the ECC word.

19 Claims, 7 Drawing Sheets

| Number of Parity bits | 6 | 7 | 8 | 9 | 10 |
|---|---|---|---|---|---|
| Hamming Code | (63,57) | (127,120) | (255,247) | (511,502) | (1023,1013) |

FIG. 5

| Number of data bits | 64 | 128 | 256 | 512 |
|---|---|---|---|---|
| Number of Parity bits | 7 | 8 | 9 | 10 |

FIG. 6

| Number of IO pins | Unit of Data bits | Number of Parity bits | Number of error bits |
|---|---|---|---|
| 512 | 512 | 10 | 1 |
| 512 | 256 | 9 x 2 = 18 | 2 |
| 512 | 128 | 8 x 4 = 32 | 4 |
| 512 | 64 | 7 x 8 = 56 | 8 |

STACKED SEMICONDUCTOR MEMORY DEVICE AND RELATED ERROR-CORRECTION METHOD

CROSS-REFERENCE TO RELATED APPLICATIONS

This application claims priority under 35 U.S.C. §119 to Korean Patent Application No. 10-2010-0024406 filed on Mar. 18, 2010, the disclosure of which is hereby incorporated by reference in its entirety.

BACKGROUND

Embodiments of the inventive concept relate generally to electronic memory technologies. More particularly, embodiments of the inventive concept relate to stacked semiconductor memory devices and related error-correction methods.

Semiconductor memory devices can be roughly divided into two categories according to whether they retain stored data when disconnected from power. These categories include volatile memory devices, which lose stored data when disconnected from power, and nonvolatile memory devices, which retain stored data when disconnected from power. Examples of volatile memory devices include dynamic random access memory (DRAM) and static random access memory (SRAM). Examples of nonvolatile memory include phase-change RAM (PRAM), resistive RAM (RRAM), magnetic RAM (MRAM), and electrically erasable programmable read only memory (EEPROM).

Nonvolatile memory devices have gained increasing popularity in recent years due to a variety of trends, such as the increasing demand for long term data storage and the proliferation of mobile devices that need to retain stored data when disconnected from power.

Some nonvolatile memory devices store data using variable resistance elements that change between different resistive states to represent different data values. Such nonvolatile memory devices are referred to as resistive memory devices.

A resistive memory device typically comprises a plurality of unit memory cells each comprising a variable resistive element and a switching element. The variable resistive element is typically connected between a bit line and the switching element, and the switching element is typically connected between the variable resistive element and a word line.

Examples of resistive memory devices include PRAM, RRAM, and MRAM. In a PRAM, the variable resistance element comprises a phase-change material such as chalcogenide that changes resistance in response to applied heat. In an RRAM, the variable resistance element comprises an upper electrode, a lower electrode, and a transition metal oxide between the upper and lower electrodes. In an MRAM, the variable resistive element comprises a ferromagnetic upper electrode, a ferromagnetic lower electrode, and a ferromagnetic material between the upper and lower electrodes.

In an effort to improve the performance and storage density of resistive memory devices, researchers have developed resistive memory devices in which memory cell array layers are stacked in a 3-dimensional configuration on a semiconductor substrate.

SUMMARY

Embodiments of the inventive concept provide stacked semiconductor memory devices that are capable of flexibly controlling the number of bits in an error correction code (ECC) word. The stacked semiconductor memory devices can be used in random access memories. Embodiments of the inventive concept also provide memory systems comprising stacked semiconductor memory devices and methods of correcting errors in stacked semiconductor memory devices using ECC words of variable size.

According to one embodiment of the inventive concept, a stacked semiconductor memory device comprises a semiconductor substrate, a plurality of memory cell array layers stacked on the semiconductor substrate, and an error correction code (ECC) controller configured to determine a number of bits in an ECC word and correct an error generated in the memory cell array layers using the ECC word.

In certain embodiments, the ECC controller is configured to receive a first ECC word comprising a first parity code from the plurality of memory cell array layers and to provide the first ECC word to an input/output (I/O) circuit in a read operation mode, and the ECC controller is further configured to generate a second parity code using data received via the I/O circuit and to provide second ECC data comprising the second parity code to the plurality of memory cell array layers in a write operation mode.

In certain embodiments, each of the memory cell array layers has a cross-point structure in which memory cells are disposed at intersections between bit lines and word lines.

In certain embodiments, the memory cells comprise resistive elements.

In certain embodiments, the ECC controller is configured to control the number of bits in the ECC word according to fabrication yields of the plurality of memory cell array layers.

In certain embodiments, the ECC controller is configured to control the number of bits in the ECC word according to a read latency of the stacked semiconductor memory device.

In certain embodiments, the number of bits in the ECC word corresponds to a number of I/O data pins divided by an integer greater than one.

In certain embodiments, each of the memory cell array layers outputs an ECC word with same number of bits.

In certain embodiments, the ECC word corresponds to a unit of data generated by combining data output from one memory block of each of the memory cell array layers.

In certain embodiments, the error is corrected by a decoder using parity bits of the ECC word.

In certain embodiments, the ECC controller is formed in the semiconductor substrate.

According to another embodiment of the inventive concept, a memory system comprises a memory controller configured to generate an address signal and a command signal, and a stacked semiconductor memory device configured to store received data or output stored data based on the address signal and the command signal. The stacked semiconductor memory device comprises a semiconductor substrate, a plurality of memory cell array layers stacked on the semiconductor device, and an ECC controller configured to determine a number of bits in an ECC word and correct an error in the memory cell array layers using the ECC word.

In certain embodiments, the ECC controller is configured to receive first ECC data comprising a first parity bit from the memory cell array layers and to provide the first ECC data to an I/O circuit in a read operation mode, and the ECC controller is further configured to generate a second parity bit using received data via the I/O circuit and to provide second ECC data comprising the second parity bit to the plurality of memory cell array layers in a write operation mode.

In certain embodiments, the ECC controller controls the number of bits in the ECC word according to respective fabrication yields of the plurality of memory cell array layers.

In certain embodiments, the ECC controller is configured to control the number of bits in the ECC word according to a read latency of the stacked semiconductor memory device.

In certain embodiments, the ECC data comprises 128 data bits and 8 parity bits.

According to another embodiment of the inventive concept, a method is provided for correcting an error in a stacked semiconductor memory device. The method comprises controlling a number of bits in an ECC word, and correcting an error generated in memory cell array layers using the ECC word having the controlled number of bits.

In certain embodiments, the number of bits in the ECC word is controlled according to fabrication yields of the memory cell array layers.

In certain embodiments, the number of bits in the ECC word is controlled according to a read latency of the stacked semiconductor memory device.

In certain embodiments, the number of bits in the ECC word corresponds to a number of I/O data pins divided by an integer greater than one.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

In the description that follows, where a feature is referred to as being "on," "connected to," or "coupled to" another feature, it can be directly on, connected or coupled to the other feature or intervening features may be present. In contrast, where a feature is referred to as being "directly on," "directly connected to," or "directly coupled to" another feature, there are no intervening features present. The term "and/or" indicates any and all combinations of one or more of the associated listed items.

Although the terms first, second, third, etc., are used herein to describe various features, these features should not be limited by these terms. Rather, these terms are only used to distinguish one feature from another. Accordingly, a first feature discussed below could be termed a second feature without departing from the scope of the inventive concept.

Spatially relative terms, such as "beneath," "below," "lower," "above," "upper" and the like, may be used to describe spatial relationships between different features. These terms, however, are intended to encompass different orientations of the device in addition to those depicted in the figures. For example, where a device in the figures is turned over, elements described as "below" or "beneath" other elements or features would then be oriented "above" the other elements or features. Thus, the term "below" can encompass both an orientation of above and below. A device may be otherwise oriented (e.g., rotated 90 degrees or at other orientations), with spatially relative descriptors interpreted accordingly.

The terminology used herein is for the purpose of describing particular embodiments only and is not intended to limit the inventive concept. The singular forms "a," "an" and "the" are intended to include plural forms as well, unless the context clearly indicates otherwise. The terms "comprises" and/or "comprising," when used in this specification, specify the presence of stated features, but do not preclude additional features.

Embodiments are described with reference to cross-sectional illustrations of idealized embodiments. As such, variations from the shapes of the illustrations are to be expected due to variations in manufacturing processes and other variables. Accordingly, embodiments should not be construed as limited to the particular shapes illustrated herein. As an example, an implanted region illustrated as a rectangle will typically have rounded or curved features and/or a gradient of implant concentration at its edges rather than a binary change from an implanted to a non-implanted region. Similarly, the formation of buried region by implantation may result in some implantation in a region between the buried region and a surface through which the implantation takes place.

Unless otherwise defined, all terms (including technical and scientific terms) used herein have the same meaning as commonly understood by one of ordinary skill in the art. Terms, such as those defined in commonly used dictionaries, should be interpreted as having a meaning that is consistent with their meaning in the context of the relevant art and should not be interpreted in an idealized or overly formal sense unless expressly so defined herein.

Figure 1:
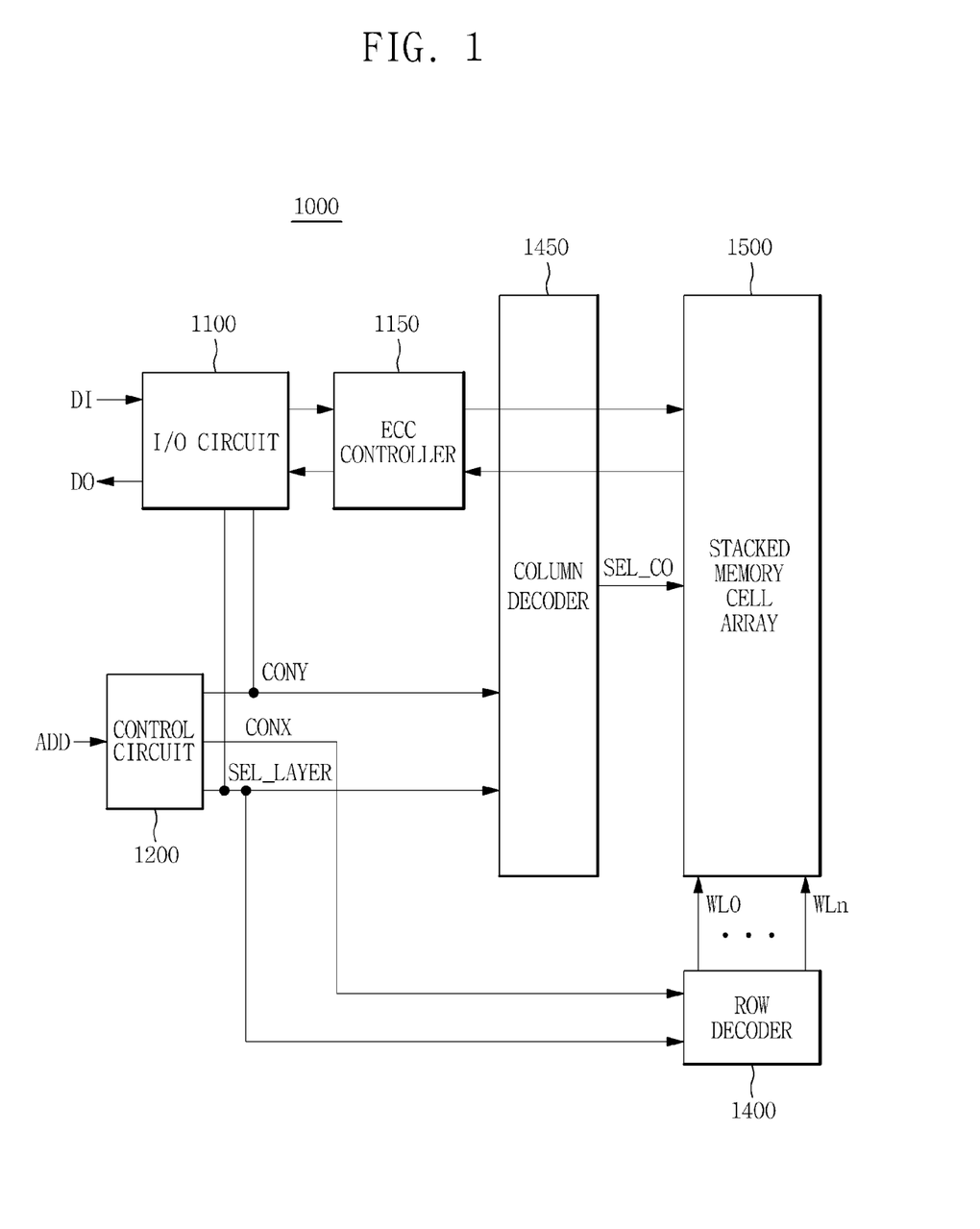
FIG. 1 is a block diagram illustrating a stacked semiconductor memory device according to an embodiment of the inventive concept.

FIG. 1 is a block diagram illustrating a stacked semiconductor memory device 1000 according to an embodiment of the inventive concept.

Referring to FIG. 1, stacked semiconductor memory device 1000 comprises an input/output (I/O) circuit 1100, an error correction code (ECC) controller 1150, a control circuit 1200, a row decoder 1400, a column decoder 1450, and a stacked memory cell array 1500.

Control circuit 1200 establishes program modes of memory cell array layers based on an address signal ADD and program information. Control circuit 1200 controls a timing and a voltage level of address signal ADD to generate a row control signal CONX and a column control signal CONY and generates a layer selection signal SEL_LAYER based on row control signal CONX and column control signal CONY.

Row decoder 1400 decodes row control signal CONX and layer selection signal SEL_LAYER to generate word line driving signals WL0 through WLn. Row decoder 1400 provides word line driving signals WL0 through WLn to stacked memory cell array 1500.

Column decoder 1450 decodes column control signal CONY and layer selection signal SEL_LAYER to generate a column selection signal SEL_CO. Column decoder 1450 provides column selection signal SEL_CO to stacked memory cell array 1500.

I/O circuit 1100 comprises a sense amplifier and a write drive circuit. In a read operation mode, I/O circuit 1100 receives input data DI in response to column control signal CONY and layer selection signal SEL_LAYER and provides input data DI to ECC controller 1150. In a write operation mode, I/O circuit 1100 receives an output signal of ECC controller 1150 and amplifies the output signal to generate output data DO.

ECC controller 1150 controls error correction operations of stacked semiconductor memory device 1000. In a read operation mode, ECC controller 1150 receives ECC data comprising a parity bit from stacked memory cell array 1500. ECC controller 1150 then provides the ECC data to I/O circuit 1100. In a write operation mode, ECC controller 1150 generates a parity bit using ECC data received via I/O circuit 1100 and provides the ECC data comprising the parity bit to stacked memory cell array 1500.

Stacked memory cell array 1500 can be integrated with ECC controller 1150 to flexibly control the number of bits in the ECC data as will be described later.

Figure 2:
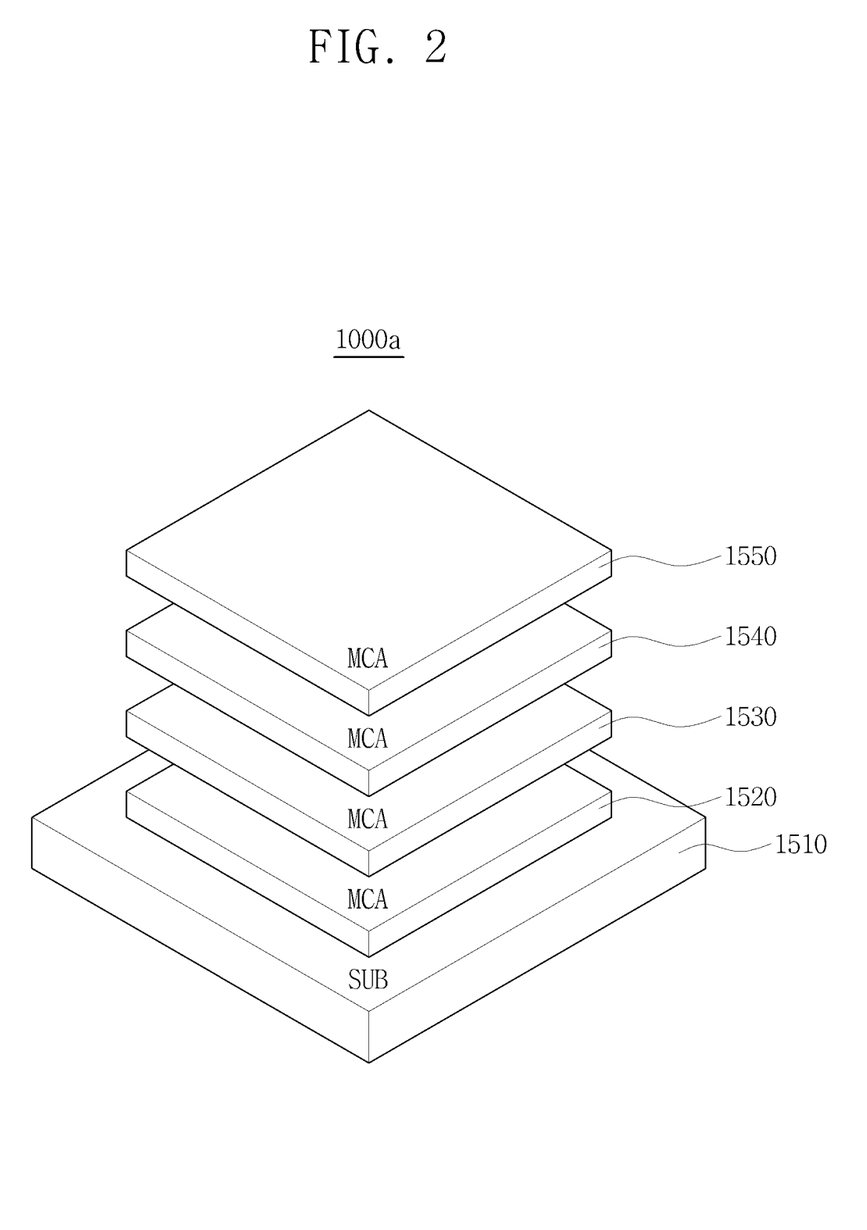
FIG. 2 is a perspective view illustrating a semiconductor memory device comprising a 3-dimensional memory cell array.

FIG. 2 is a perspective view illustrating a semiconductor memory device 1000a comprising a 3-dimensional memory cell array. Semiconductor memory device 1000a is an example of stacked semiconductor memory device 1000 of FIG. 1.

Referring to FIG. 2, semiconductor memory device 1000a comprises a semiconductor substrate 1510 and memory cell array layers 1520, 1530, 1540, and 1550.

Semiconductor substrate 1510 comprises functional circuits, such as decoders, controllers, and so on. Memory cell array layers 1520, 1530, 1540, and 1550 are stacked on semiconductor substrate 1510 and are electrically connected to a decoder in semiconductor substrate 1510 via vertical connection lines and horizontal connection lines.

In the example of FIG. 2, memory cell array layers 1520, 1530, 1540, and 1550 correspond to stacked memory cell array 1500 of FIG. 1, and I/O circuit 1100, ECC controller 1150, control circuit 1200, row decoder 1400, and column decoder 1450 are formed in semiconductor substrate 1510.

Figure 3:
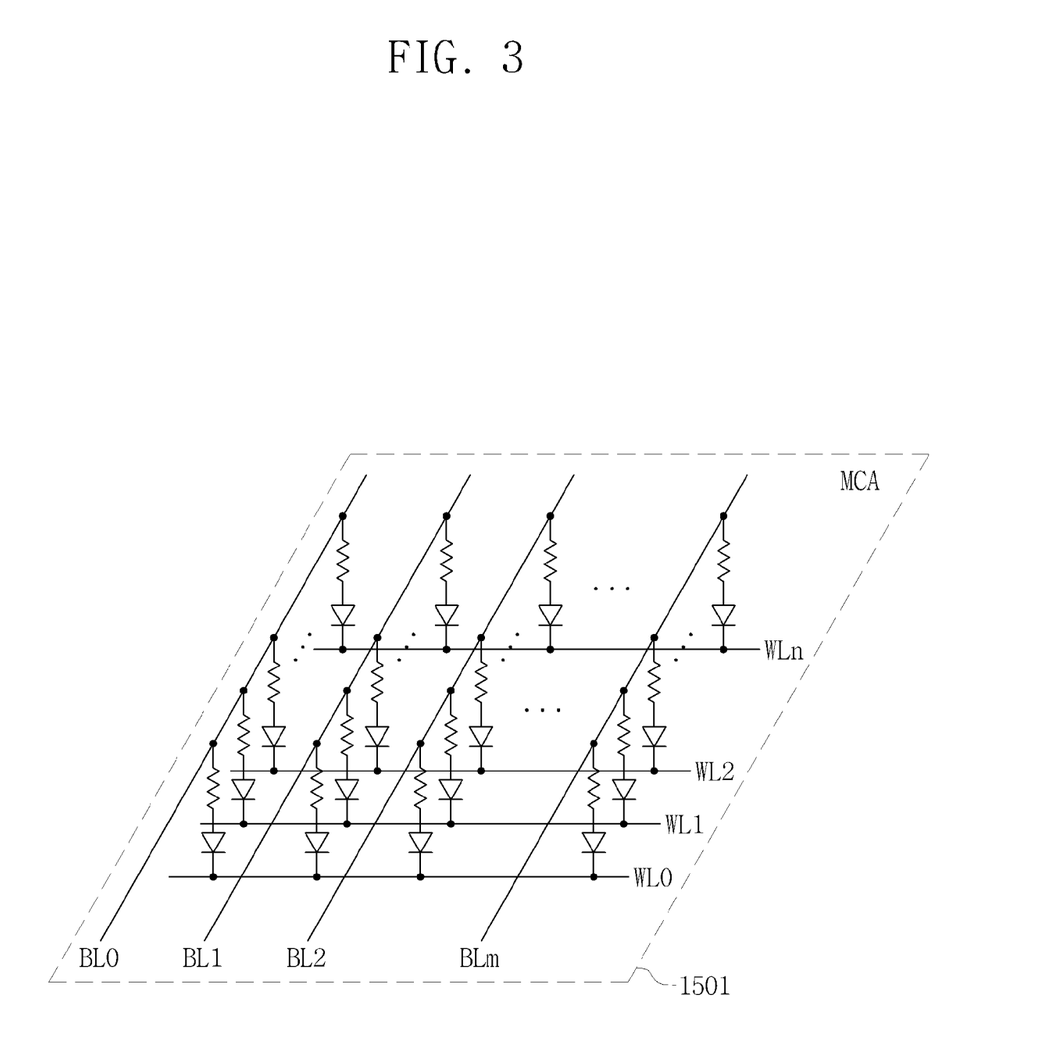
FIG. 3 is a circuit diagram illustrating an example of a memory cell array layer in the stacked semiconductor memory device of FIG. 2.

FIG. 3 is a circuit diagram illustrating an example of a memory cell array layer in semiconductor memory device 1000a of FIG. 2.

Referring to FIG. 3, bit lines BL0 through BLm and word lines WL0 through WLn are disposed in a memory cell array (MCA) layer 1501. MCA layer 1501 has a cross-point structure in which memory cells are arranged at intersections between bit lines BL0 through BLm and word lines WL0 through WLn. Each of the memory cells of FIG. 3 comprises a switching element and a diode connected in series.

Figure 4:
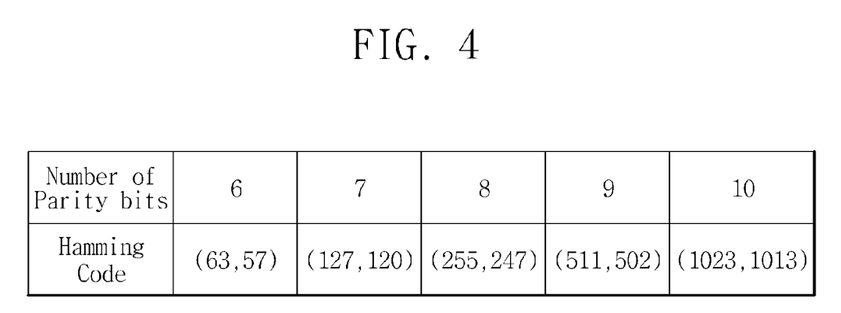
FIG. 4 is a table illustrating Hamming codes and corresponding numbers of parity bits.

FIG. 4 is a table illustrating Hamming codes and corresponding numbers of parity bits. A Hamming code is an ECC that is commonly used in memory systems. Hamming codes are capable of performing single bit error correction and double bit error detection.

A Hamming code can be characterized by a number of bits used for error correction and detection, and a number of transmitted data bits. For a number "m" (m>2) of error correction or detection bits, there is a $(2^m-1, 2^m-m-1)$ Hamming code, where $2^{m-1}-1$ is a total number of bits in the code, and $2^m-m-1$ is a number of data bits in the code. As an example, for m=4, there is a (15, 11) Hamming code. In addition, a (12, 8) Hamming code is a reduced version of the (15, 11) Hamming code.

In stacked semiconductor memory device 1000, ECC controller 1150 is configured to flexibly control the length of the Hamming code. Accordingly, different Hamming codes can be used in conjunction with different numbers of parity bits. In the example of FIG. 4, as the number of parity bits varies between 6, 7, 8, 9, and 10, corresponding Hamming codes vary between (63, 57), (127, 120), (255, 247), (511, 502), and (1023, 1013).

Figure 5:
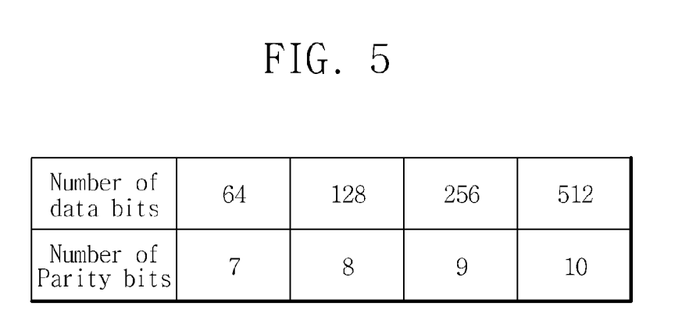
FIG. 5 is a table illustrating different numbers of parity bits corresponding to different numbers of data bits.

FIG. 5 is a table illustrating different numbers of parity bits corresponding to different numbers of data bits. The example of FIG. 5 can be used in a memory device comprising an I/O data structure using 8-bit addressing.

Referring to FIG. 5, 7 parity bits are used in conjunction with 64 data bits, and 8 parity bits are used in conjunction with 128 data bits. Similarly, 9 parity bits are used in conjunction with 256 data bits, and 10 parity bits are used in conjunction with 512 data bits.

Figure 6:
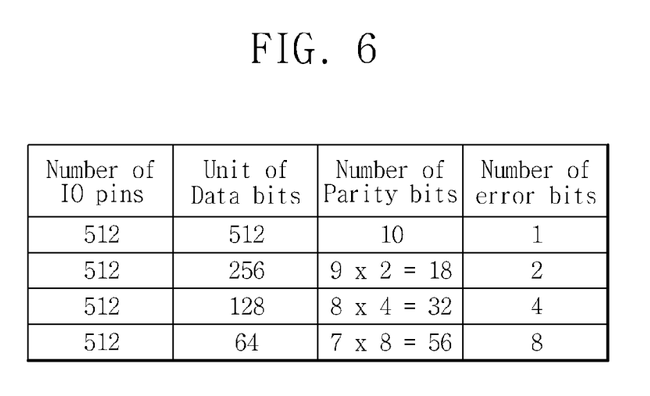
FIG. 6 is a table illustrating the number error bits that can be corrected in 512 data bits using different coding schemes.

FIG. 6 is a table illustrating the number of error bits that can be corrected in 512 data bits using different coding schemes. Each of the schemes of FIG. 6 is implemented in a system using a 512-bit I/O interface.

Referring to FIG. 6, 10 parity bits can be used to perform error correction on 512 data bits formed in a single unit, 18 parity bits can be used to perform error correction on 512 data bits formed in two units of 256 bits each, 32 parity bits can be used to perform error correction on 512 data bits formed in four units of 128 bits each, and 64 parity bits can be used to perform error correction on 512 data bits formed in eight units of 64 bits each.

As indicated by FIG. 6, as data is transmitted in smaller units, the proportion of parity bits increases, but error correction efficiency increases as well. In addition, transmitting data in smaller units can reduce overall read latency and data decoding time. Accordingly, in different circumstances, different coding schemes such as those illustrated in FIG. 6 can be used to adjust error correction efficiency and data throughput in an ECC system of a stacked memory device within a random access memory (RAM).

Figure 7:
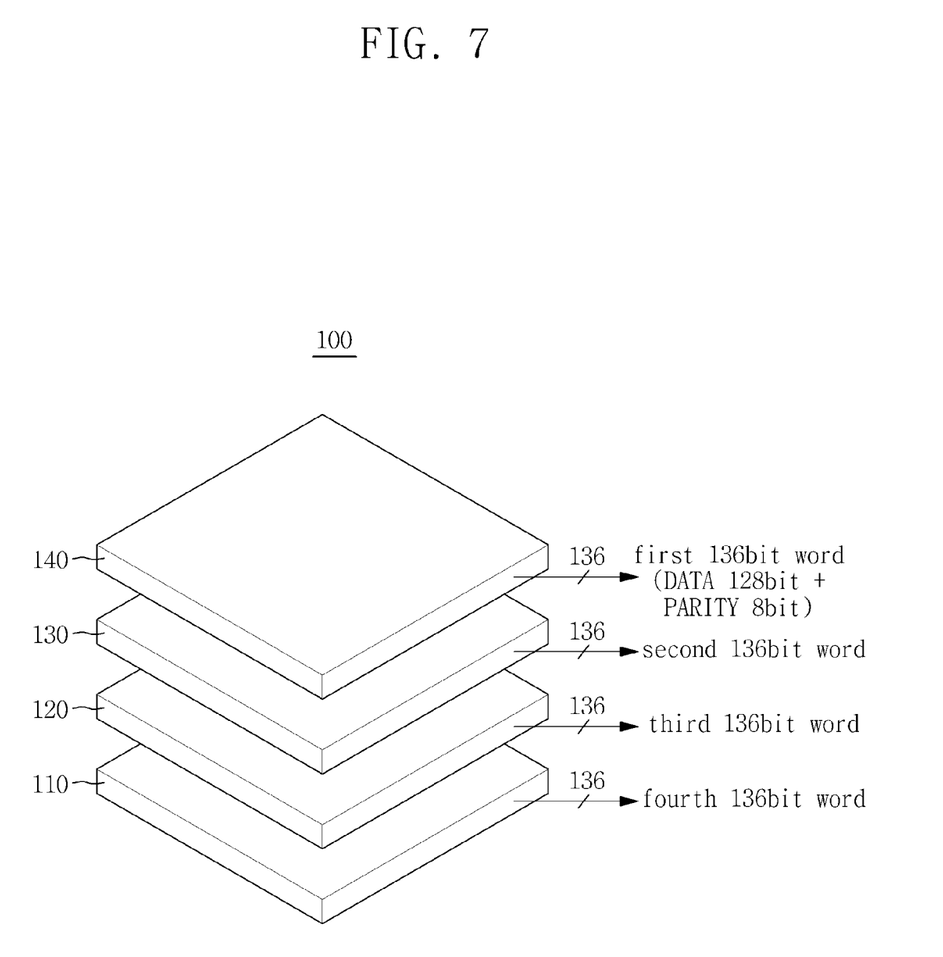
FIG. 7 is a perspective view illustrating a stacked semiconductor memory device in which multiple memory cell array layers output ECC data with the same number of bits.

FIG. 7 is a perspective view illustrating a stacked semiconductor memory device 100 in which multiple memory cell array layers 110 through 140 output ECC data with the same number of bits. In the example of FIG. 7, an ECC system divides I/O data by an integer value.

Referring to FIG. 7, each of memory cell array layers 110, 120, 130, and 140 outputs 136-bit ECC data comprising 128 data bits and 8 parity bits. Memory cell array layer 140 outputs a first 136-bit word and memory cell array layer 130 outputs a second 136-bit word. Memory cell array layer 120 outputs a third 136-bit word and memory cell array layer 110 outputs a fourth 136-bit word.

Each of memory cell array layers 110, 120, 130, and 140 performs error correction in a 128-bit unit by dividing 512-bit data by 4 and using 8 parity bits. This requires a total of 32 parity bits (8 bits*4) to correct errors in all of the 512-bit data output from memory cell array layers 110, 120, 130, and 140.

Where the demand for read latency is relaxed, ECC controller 1150 of FIG. 1 can perform the error correction in 256-bit units by dividing 512-bit data by 2 and using 9 parity bits. This requires a total of 18 parity bits (9 bits*2) to correct errors in all of the 512-bit data output from memory cell array layers 110, 120, 130, and 140. Accordingly, where error correction is performed in 256-bit units, the number of parity bits can be reduced by 14 compared with error correction performed in 128-bit units as illustrated in FIG. 7. In a similar fashion, where the demand for read latency is further relaxed, ECC controller 1150 can perform error correction in 512-bit units using 10 parity bits.

The size of the unit on which error correction is performed can be controlled according to fabrication yield of a semiconductor chip. For example, where the fabrication yield is high, the error correction can be performed on 512-bit units, and where the fabrication yield is low, the error correction can be performed on 64-bit units.

In addition, the semiconductor memory device of FIG. 2 may have error probabilities that vary in a direction perpendicular to the substrate. For example, a memory cell array layer disposed farthest from the substrate may be least stressed by stack processes, and it may have a highest fabrication yield. Meanwhile, a memory cell array layer disposed closest to the substrate may be most stressed by a repeated stack process, and it may have the lowest fabrication yield. Memory blocks included in the memory cell array layer tend to have similar error probabilities.

Figure 8:
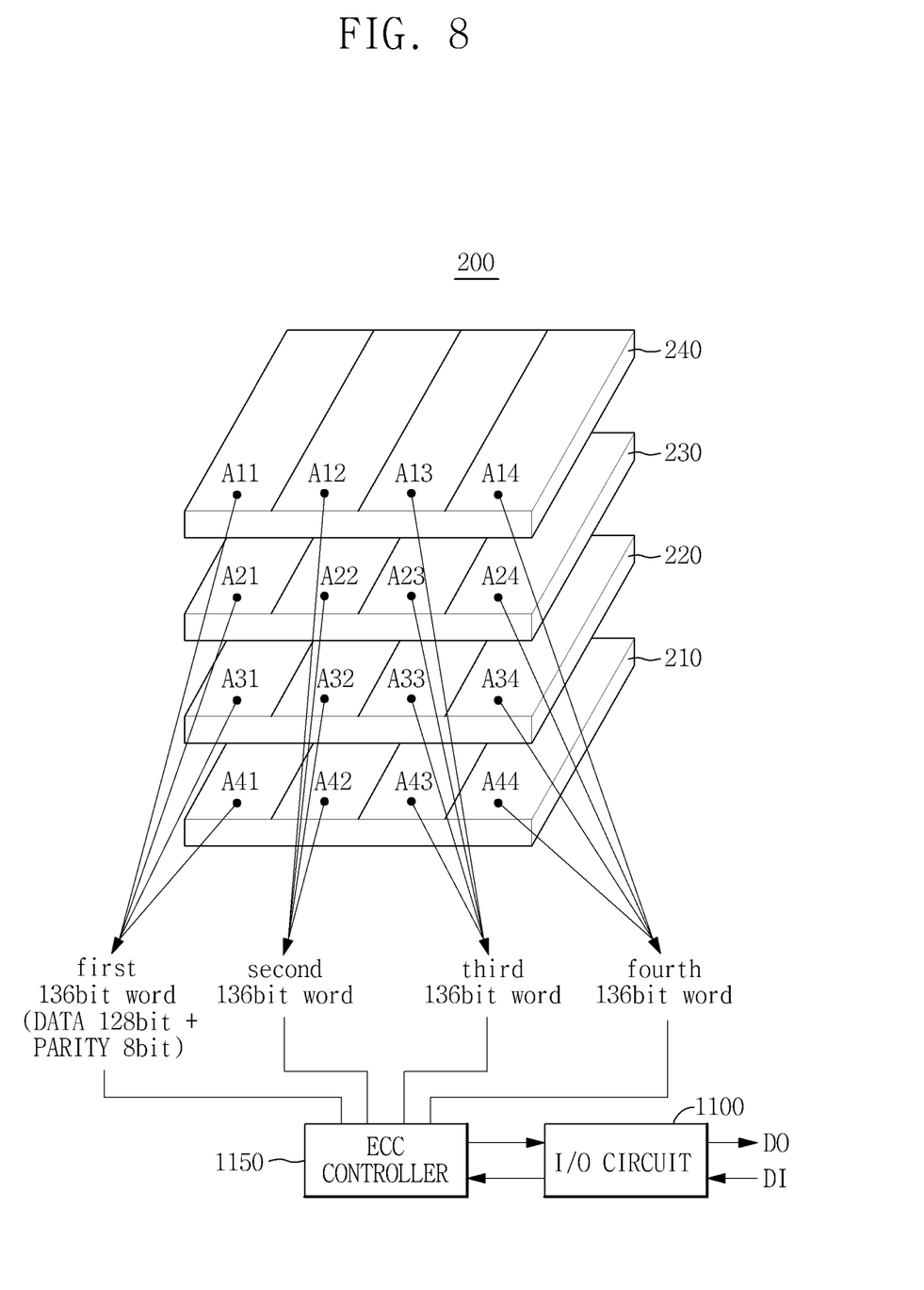
FIG. 8 is a perspective view illustrating a stacked semiconductor memory device in which each memory cell array layer is divided into a plurality of memory blocks and ECC data is constructed by combining data from memory blocks of different memory cell array layers.

FIG. 8 is a perspective view illustrating a stacked semiconductor memory device 200 in which each memory cell array layer is divided into a plurality of memory blocks and ECC data is constructed by combining data from memory blocks of different memory cell array layers.

Referring to FIG. 8, stacked semiconductor memory device 200 comprises memory cell array layers 210, 220, 230, and 240, an ECC controller 1150 and an I/O circuit 1100. Each of memory cell array layers 210, 220, 230, and 240 comprises a plurality of memory blocks. Stacked semiconductor memory device 200 combines 34 bits of data from memory blocks of each of memory cell array layers 210, 220, 230, and 240 to generate 136-bit ECC data. The ECC data comprises 128 data bits and 8 parity bits.

Memory cell array layer 240 comprises memory blocks A11, A12, A13, and A14, and memory cell array layer 230 comprises memory blocks A21, A22, A23, and A24. Memory cell array layer 220 comprises memory blocks A31, A32, A33, and A34, and memory cell array layer 210 comprises memory blocks A41, A42, A43, and A44.

The 34-bit data output from first memory block A11 of the memory cell array layer 240, first memory block A21 of memory cell array layer 230, first memory block A31 of memory cell array layer 220, and first memory block A41 of memory cell array layer 210 are combined to generate a first 136-bit ECC word. The 34-bit data output from second memory block A12 of memory cell array layer 240, second memory block A22 of memory cell array layer 230, second memory block A32 of memory cell array layer 220, and second memory block A42 of memory cell array layer 210 are combined to generate a second 136-bit ECC word. The 34-bit data output from third memory block A13 of memory cell array layer 240, third memory block A23 of memory cell array layer 230, third memory block A33 of memory cell array layer 220, and third memory block A43 of memory cell array layer 210 are combined to generate a third 136-bit ECC word. The 34-bit data output from fourth memory block A14 of memory cell array layer 240, fourth memory block A24 of memory cell array layer 230, fourth memory block A34 of memory cell array layer 220, and fourth memory block A44 of memory cell array layer 210 are combined to generate a fourth 136-bit ECC word.

Stacked semiconductor memory device 200 of FIG. 8 divides a cell array area of each of the memory cell array layers by 4 to improve error correction efficiency. While the stacked semiconductor memory device of FIG. 7 can correct one error in 128-bit data from one memory cell array layer, the stacked semiconductor memory device of FIG. 8 can correct a maximum of four errors in 128-bit data of one memory cell array layer. For example, where there is no error in memory cell array layers 210, 220, and 230 and there are four errors in memory blocks A11, A12, A13, and A14 of memory cell array layer 240, respectively, the four errors can be corrected by different ECC words.

In a read operation mode, ECC controller 1150 receives first through fourth ECC data from the memory cell array layers 210, 220, 230, and 240 and provides them to I/O circuit 1100. In a write operation mode, ECC controller 1150 generates a parity bit using received data via I/O circuit 1100 and provides input ECC data comprising the parity bit to memory cell array layers 210, 220, 230, and 240. In addition, ECC controller 1150 may flexibly control the size and the number of error correction bits in the ECC data.

Figure 9:
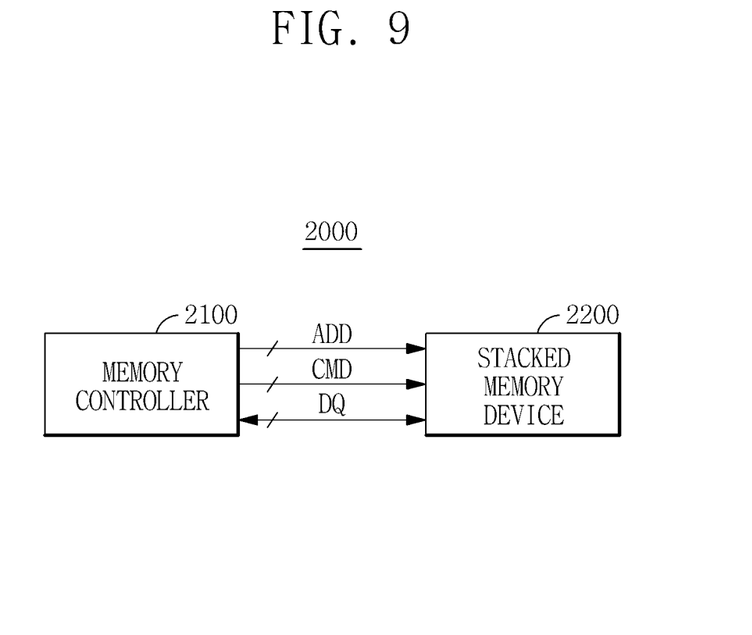
FIG. 9 is a block diagram illustrating a memory system comprising a stacked semiconductor memory device according to an embodiment of the inventive concept.

FIG. 9 is a block diagram illustrating a memory system 2000 comprising a stacked semiconductor memory device according to an embodiment of the inventive concept.

Referring to FIG. 9, memory system 2000 comprises a memory controller 2100 and a stacked semiconductor memory device 2200.

Memory controller 2100 generates an address signal ADD and a command CMD and provides them to stacked semiconductor memory device 2200 via buses. Data DQ is transmitted between memory controller 2100 and stacked semiconductor memory device 2200 via a bus.

Stacked semiconductor memory device 2200 has the stacked structure of the stacked semiconductor memory devices 1000 or 1000a and stores or outputs data DQ based on address signal ADD and command CMD. As described above, stacked semiconductor memory device 2200 comprises ECC controller 1150 to flexibly control the size and number of error correction bits of ECC data. Accordingly, stacked semiconductor memory device 2200 can have high error correction efficiency.

In certain embodiments, a stacked semiconductor memory device has a data path comprising a decoder capable of error correction with a relatively large number of parity bits.

Figure 10:
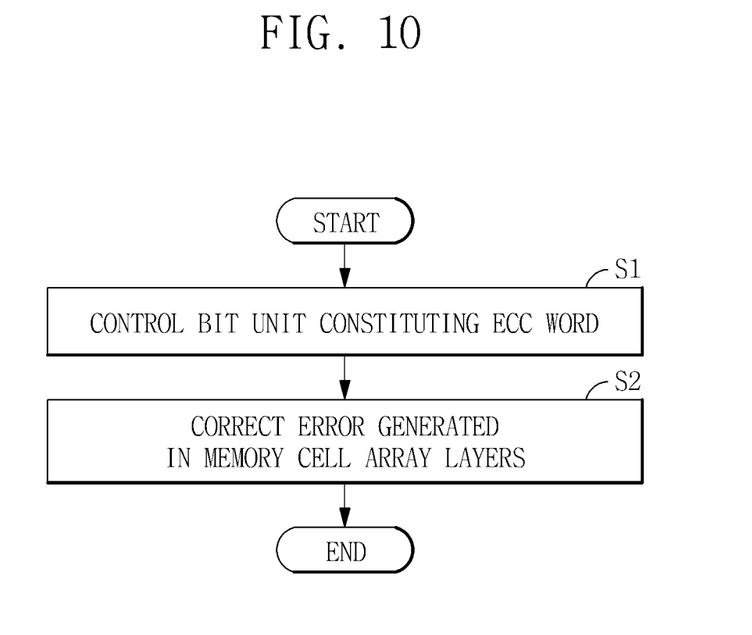
FIG. 10 is a flowchart illustrating a method of correcting errors in a stacked semiconductor memory device according to an embodiment of the inventive concept.

FIG. 10 is a flowchart illustrating a method of correcting errors in a stacked semiconductor memory device according to an embodiment of the inventive concept.

Referring to FIG. 10, the method comprises controlling the size of ECC words used to correct errors (S1), and correcting errors generated in memory cell array layers using the ECC words (S2).

In some embodiments, the size of ECC words is controlled according to fabrication yields of memory cell array layers.

In some embodiments, the size of ECC words is controlled according to a read latency specification.

In some embodiments, the size of ECC words is determined by dividing a number of I/O data pins by a positive integer.

Although certain embodiments relate to methods of correcting errors in stacked semiconductor memory devices comprising resistive memory cell array layers, the inventive concept is not limited to these types of stacked semiconductor memory devices, and can be applied to other types, such as those using a conventional stack structure having interlayer connection units.

As indicated by the foregoing, a stacked semiconductor memory device can flexibly control the size of an ECC word. Such a stacked semiconductor memory device can be used to implement a RAM with high error correction efficiency.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A stacked semiconductor memory device, comprising:
a semiconductor substrate;
a plurality of memory cell array layers stacked on the semiconductor substrate; and
an error correction code (ECC) controller configured to determine a number of bits in an ECC word and correct an error generated in the memory cell array layers using the ECC word,
wherein the ECC controller is configured to generate a first parity code using data received via an input/output (I/O) circuit and to provide a first ECC word comprising the first parity code to the plurality of memory cell array layers in a write operation mode.

2. The stacked semiconductor memory device of claim 1, wherein each of the memory cell array layers has a cross-point structure in which memory cells are disposed at intersections between bit lines and word lines.

3. The stacked semiconductor memory device of claim 2, wherein the memory cells comprise resistive elements.

4. The stacked semiconductor memory device of claim 1, wherein the ECC controller is configured to control the number of bits in the ECC word according to fabrication yields of the plurality of memory cell array layers.

5. The stacked semiconductor memory device of claim 1, wherein the ECC controller is configured to control the number of bits in the ECC word according to a read latency of the stacked semiconductor memory device.

6. The stacked semiconductor memory device of claim 1, wherein the number of bits in the ECC word corresponds to a number of input/output (I/O) data pins divided by an integer greater than one.

7. The stacked semiconductor memory device of claim 1, wherein each of the memory cell array layers outputs an ECC word with a same number of parity bits.

8. The stacked semiconductor memory device of claim 1, wherein the ECC word corresponds to a unit of data generated by combining data output from one memory block of each of the memory cell array layers.

9. The stacked semiconductor memory device of claim 1, wherein the error is corrected by a decoder using parity bits of the ECC word.

10. The stacked semiconductor memory device of claim 1, wherein the ECC controller is formed in the semiconductor substrate.

11. The stacked semiconductor memory device of claim 1, wherein the ECC controller is further configured to receive a second ECC word comprising a second parity code from the plurality of memory cell array layers and to provide the second ECC word to the I/O circuit in a read operation mode.

12. A memory system, comprising:
a memory controller configured to generate an address signal and a command signal; and
a stacked semiconductor memory device configured to store received data or output stored data based on the address signal and the command signal,
wherein the stacked semiconductor memory device comprises:
a semiconductor substrate;
a plurality of memory cell array layers stacked on the semiconductor substrate; and
an error correction code (ECC) controller configured to determine a number of bits in an ECC word and correct an error in the memory cell array layers using the ECC word,
wherein the ECC controller is configured to generate a first parity bit using received data via an input/output (I/O) circuit and to provide a first ECC word comprising the first parity bit to the plurality of memory cell array layers in a write operation mode.

13. The memory system of claim 12, wherein the ECC controller is configured to control the number of bits in the ECC word according to respective fabrication yields of the plurality of memory cell array layers.

14. The memory system of claim 12, wherein the ECC controller is configured to control the number of bits in the ECC word according to a read latency of the stacked semiconductor memory device.

15. The memory system of claim 12, wherein the ECC word comprises 128 data bits and 8 parity bits.

16. The memory system of claim 12, wherein the ECC controller is further configured to receive a second ECC word comprising a second parity bit from the memory cell array layers and to provide the second ECC word to the I/O circuit in a read operation mode.

17. A method of correcting an error in a stacked semiconductor memory device, comprising:
controlling a number of bits in an ECC word; and
correcting an error generated in memory cell array layers using the ECC word having the controlled number of bits,
wherein the number of bits in the ECC word is controlled according to fabrication yields of the memory cell array layers.

18. The method of claim 17, wherein the number of bits in the ECC word is controlled according to a read latency of the stacked semiconductor memory device.

19. The method of claim 17, wherein the number of bits in the ECC word corresponds to a number of input/output (I/O) data pins divided by an integer greater than one.

* * * * *